(12) United States Patent
Silva et al.

(10) Patent No.: US 11,630,505 B2
(45) Date of Patent: Apr. 18, 2023

(54) INTERACTIVE ENERGY EFFECT ATTRACTION

(71) Applicant: Universal City Studios LLC, Universal City, CA (US)

(72) Inventors: Giulianna Silva, Orlando, FL (US); Michael Tresaugue, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 17/507,490

(22) Filed: Oct. 21, 2021

(65) Prior Publication Data

US 2022/0129063 A1    Apr. 28, 2022

Related U.S. Application Data

(60) Provisional application No. 63/105,643, filed on Oct. 26, 2020.

(51) Int. Cl.
| | |
|---|---|
| G06F 3/01 | (2006.01) |
| G06T 19/00 | (2011.01) |
| H05H 1/24 | (2006.01) |
| A63G 31/00 | (2006.01) |

(52) U.S. Cl.
CPC ............ *G06F 3/011* (2013.01); *A63G 31/00* (2013.01); *G06T 19/006* (2013.01); *H05H 1/24* (2013.01)

(58) Field of Classification Search
CPC ......... G06F 3/011; A63G 31/00; A63G 33/00; G06T 19/006; H05H 1/24; A63F 13/428; A63F 13/212
See application file for complete search history.

(56) References Cited

U.S. PATENT DOCUMENTS

| | | |
|---|---|---|
| 5,356,343 A | 10/1994 | Lovetere |
| 7,429,818 B2 | 9/2008 | Chang et al. |
| 8,400,348 B1* | 3/2013 | Guice ............... G01S 13/88 |
| | | 235/404 |
| 8,537,958 B2 | 9/2013 | Laberge et al. |
| 9,151,572 B1* | 10/2015 | Sieracki ............... F41G 3/18 |
| 10,780,359 B2 | 9/2020 | Leiba et al. |
| 2011/0011734 A1 | 1/2011 | Marunaka et al. |

(Continued)

FOREIGN PATENT DOCUMENTS

JP     2003208263 A     7/2003

OTHER PUBLICATIONS

PCT/US2021/056445 International Search Report and Written Opinion dated Feb. 10, 2022.

*Primary Examiner* — Adam R. Giesy
(74) *Attorney, Agent, or Firm* — Fletcher Yoder P.C.

(57) ABSTRACT

An interactive energy effect system that includes one or more sensors configured to generate a signal indicative of a position of a user-associated object in the system. The interactive energy effect system also includes a system controller that receives the signal and generates a first and second set of instructions based on the signal. The system controller transmits the first instructions to an energy emission system to cause the energy emission system to reposition and activate an energy emitter. Additionally, the system controller transmits the second instructions to a multi-layer display system to cause the multi-layer display system to move towards or away from the user-associated object.

20 Claims, 7 Drawing Sheets

(56) References Cited

U.S. PATENT DOCUMENTS

| | | |
|---|---|---|
| 2015/0022321 A1* | 1/2015 | Lefevre ............ G06K 19/07345 340/10.1 |
| 2017/0182408 A1 | 6/2017 | Barney et al. |
| 2019/0015747 A1 | 1/2019 | Thompson et al. |

\* cited by examiner

INTERACTIVE ENERGY EFFECT ATTRACTION

CROSS-REFERENCE TO RELATED APPLICATIONS

This application claims the benefit of U.S. Provisional Application No. 63/105,643, entitled "INTERACTIVE ENERGY EFFECT ATTRACTION," filed on Oct. 26, 2020, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and other entertainment venues contain, among many other attractions, immersive areas where guests can interact with an attraction through a handheld object, such as a themed prop or toy. For example, an immersive area may be designed for use with a handheld prop or object that enables a guest to perform actions, such as swinging a sword or throwing a ball. The guest actions with the handheld objects may result in visible effects within the immersive area that are tied to the guest's own actions, facilitating a more realistic experience. While such techniques may provide more entertainment for the guest, it is presently recognized that advancements may be made to further immerse the guest within the particular attraction, ride, or interactive experience. For example, the user-associated object, implemented as a handheld or portable device, may have limited on-board capability to provide discernible feedback during an interactive experience. Accordingly, the guest may not perceive the visible effects of the interactive experience as emanating or being linked to their particular object. As such, it is now recognized that it is desirable to improve the effects linked to and/or emanating from a guest's own handheld object within an immersive area.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, an interactive energy effect system includes one or more sensors configured to generate a signal indicative of a position of a user-associated object. The interactive energy effect system also includes a system controller configured to receive the signal. The system controller is configured to generate first instructions and second instructions based on the signal, and transmit the first instructions to an energy emission system to cause the energy emission system to reposition and activate an energy emitter. Additionally, the interactive energy effect system includes transmitting the second instructions to a multi-layer display system to cause the multi-layer display system to move towards or away from the user-associated object.

In an embodiment, a method of operating an interactive energy effect system includes receiving, via a system controller, user associated-object position data, generating, via the system controller, instructions based on the position data, receiving the instructions at a movement controller, and directing movement of an energy emitter based on the instructions. Additionally, the method includes directing emission of energy from the energy emitter based on the instructions, receiving, via an additional movement controller, the communication, and directing, via the additional movement controller, movement of a multi-layer display system to intercept the energy emission at a predetermined location based on the position data.

In an embodiment, an interactive energy effect system includes an energy emitter, a display system, and a system controller configured to receive, from one or more position sensors, position data of a user associated object, and generate first instructions to orient the energy emitter relative to the display system based on the position data. The system controller also receives updated position data of the user or the user-associated object via the position sensors, wherein the updated position data is indicative of a motion pattern performed by the user or by the user-associated object. Additionally, the system controller is configured to identify the motion pattern in the position data, and generate second instructions based on the identified motion pattern to cause the display system to move towards the user-associated object or away from the user-associated object.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
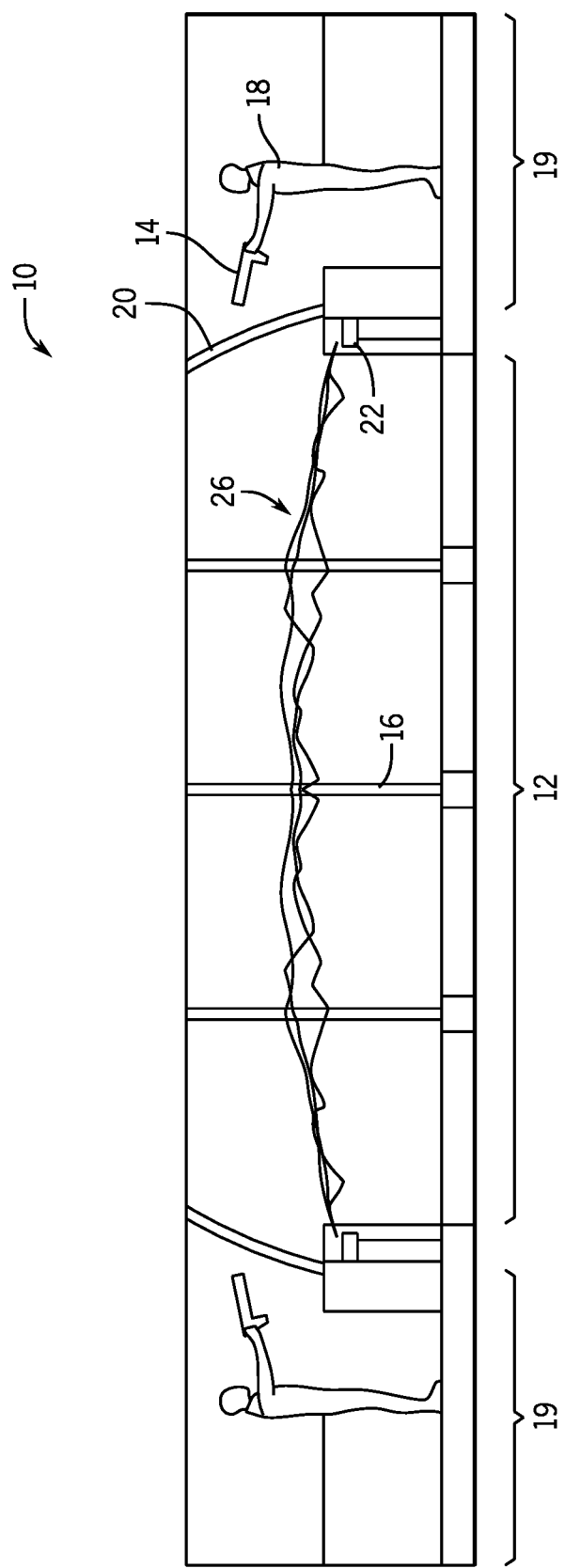
FIG. 1 is a schematic diagram illustrating a side view of an interactive energy effect attraction according to embodiments of the disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Amusement park attractions may include user-associated objects that users can interact with to provide input to and trigger feedback from an interactive experience. However, the objects themselves, in the interest of portability and cost, may be generally passive and lack observable feedback tied to the user interaction. In certain themed environments, the user-associated object may be used as a themed weapon within the environment. Generating immersive weapon effects of a user-associated object that appear to emanate from the object itself may be challenging to implement. For example, a user-associated object implemented as a portable handheld device may not carry sufficient on-board power to create a medium or long range high intensity energy beam and/or to simulate a variety of different energy beam effects using a single device. In other examples, it may be desirable for an immersive environment to facilitate an illusion that a user can generate energy effects using only their hands.

Embodiments of the present disclosure are directed to systems and methods for use in conjunction with an interactive energy effect attraction. Such systems and methods may be used, for example, as part of an immersive area, a themed environment, a battle attraction, or ride attraction in an amusement park. In accordance with present embodiments, an amusement park attraction tracks movements of a user or a user-associated object and, based on the tracked movements, creates an energy effect illusion that appears to emanate from user and/or the object itself. The present techniques include an energy emission system that is separate from the user or the user-associated object but that, when active, emits energy in a manner that enhances the illusion that the energy is shooting out from the user-associated object. In an embodiment, the present techniques may include a surface having an integral energy attractor to guide the emitted energy towards the surface. The surface may operate as a display device to display media content that exaggerates or enhances the energy effect. In an embodiment, the energy effect is a plasma or lightning effect.

By implementing an energy effect illusion in which a user's motion directly facilitates energy emission, a more immersive experience can be created. The output of energy from the energy emitter of the system enables the user to visually observe activation of the user-associated object and its output as directed by user motion. For example, present embodiments may employ sensing systems that sense motion of the user-associated object over time, and update energy emission output based on user motion. This enables the user to observe, in real time, an energy output corresponding to user motion, which facilitates an immersive experience for the user. Further, an energy emitter can be positioned and/or oriented to account for changes in position of the user to maintain the illusion, and the displayed media content can also dynamically update based on user actions.

The users may interact with the energy emission system in a battle scenario, wherein multiple users can interact with the environment, e.g., using respective user-associated objects, to trigger the energy effect. In other embodiments, a single user may interact with a prop or show object within an attraction.

As illustrated in FIG. 1, an interactive energy effect system 10 of an amusement attraction includes a user-associated object 14, an energy emission system 12, a multi-layer display system 16, and other components. Although illustrated as within a battle-type environment, it should be understood that the interactive energy effect system may be utilized to entertain users 18 in any suitable entertainment environment, such as a dark ride, an outdoor arena, an environment adjacent to a ride path of a ride vehicle carrying the users 18, and so forth.

In the illustrated embodiment, the users 18 are arranged facing or opposing one another. Notably, the user/s 18 are physically separated from the energy emission system 12 by a light transmissive or transparent barrier 20. In the illustrated embodiment, the users 18 are in respective user areas 19 in which each user 18 (e.g., a user of the system 10, a guest in the attraction) can move about freely behind the transparent barrier 20 that physically separates the user from the energy emission system 12, e.g., that extends at least partly between a floor and ceiling of the user area 19. Positioned between the user areas 19 is the energy emission system 12 that operates to control energy emission from an energy emitter 22 that is disposed between the respective transparent barriers 20.

The energy emission system 12 facilitates emission of visible energy emission effects, which may be plasma bolts 26, as in the illustrated embodiment, or other visible energy effects, such as light beams, electrical effects, lighting effects, media projection effects, augmented reality effects, pyrotechnics, vapor effects, or any combination thereof from the respective energy emitters 22. The energy emitter, in an embodiment, may include a Tesla coil gun that, in operation, emits visible energy bolts or arcs, e.g., referred to as the plasma bolts 26, using a double-tuned resonant transformer to produce high voltages at low currents. As depicted, the plasma bolts 26 are emitted towards and impinge the multi-layer display system 16. The multi-layer display system 16 may include a metallic layer that attracts or directs the emitted energy to enhance the effect. The energy emission system 12 can simulate a battle scenario between multiple users 18, each contained in the respective user area 19, while still visible to the other through the transparent barrier 20 and the at least partially transparent multi-layer display system 16. The user-associated object 14 facilitates interaction between the user 18 and energy effect emission during battle, and the user motions, e.g., via the user-associated object 14, trigger activation and control of one or both of the energy emission system 12 and the multi-layer display system 16.

In an embodiment, the user 18 performs a motion, e.g., using the user-associated object 14 or a hand motion, corresponding to a battle move or specific gesture to initiate the battle scenario. The energy emitters 22 then emit energy according to user's motion, and the multi-layer display system 16 displays effects and enhances energy emission visualization in the battle scenario by displaying animations, audio, or visual effects via a display screen. In one example, the user motion activates the energy emitter 22 from an off state to an on state or vice versa. In another example the user motion, such as moving the user-associated object 14 to the left, causes the energy emitter 22 to correspondingly orient towards the left while emitting energy. In another example, particular types of user motions can change the aim of the emitted energy, an emission focus of the emitted energy, an intensity of the emitted energy, a color of the visible plasma bolts 26, and/or the concurrently displayed media on the multi-layer display system 16.

It should be noted that each user area 19 is associated with a dedicated energy emitter 22 of the energy emission system 12. The transparent barrier 20 facilitates visibility of the user 18 and the user-associated object 14 to an opponent. It should also be appreciated that the multi-layer display system 16 can display battle updates, present the user 18 with feedback on performance and accuracy of motion of the user-associated object 14, and enable the user 18 to receive results of the battle simulation. The updated feedback provided by the multi-layer display system 16 enables the user 18 to trigger actions of the energy emission system 12 and observe the effect of the motion of the user-associated object 14 directing the plasma bolts 26 emitted from the energy emitter 22.

For example, the user 18 in the user area 19 in FIG. 1 could be prompted to perform a specific gesture or move with the user-associated object 14 via the multi-layer display system 16. The other user 18 in another user area 19 is also prompted to perform a specific gesture or move with their user-associated object 14. The energy emitter 22 for each respective user area 19 is directed (e.g., dynamically positioned and steered) based on performance of gesture by each user 18, to emit the plasma bolts 26. The users 18 observe the plasma bolts 26 launched from each of the users 18, energy emitters 22, which may be emitted in certain color or intensity variations based on the user's performance, user profile, or expressions/movements as captured by sensors of the system 10. The multi-layer display system 16, e.g., that includes a transparent OLED display screen, can then move towards or away from the respective user area 19 based on performance, and display updates to the users 18 including which user 18 performed gestures more accurately, and the stats or previous history of each user 18.

Figure 2:
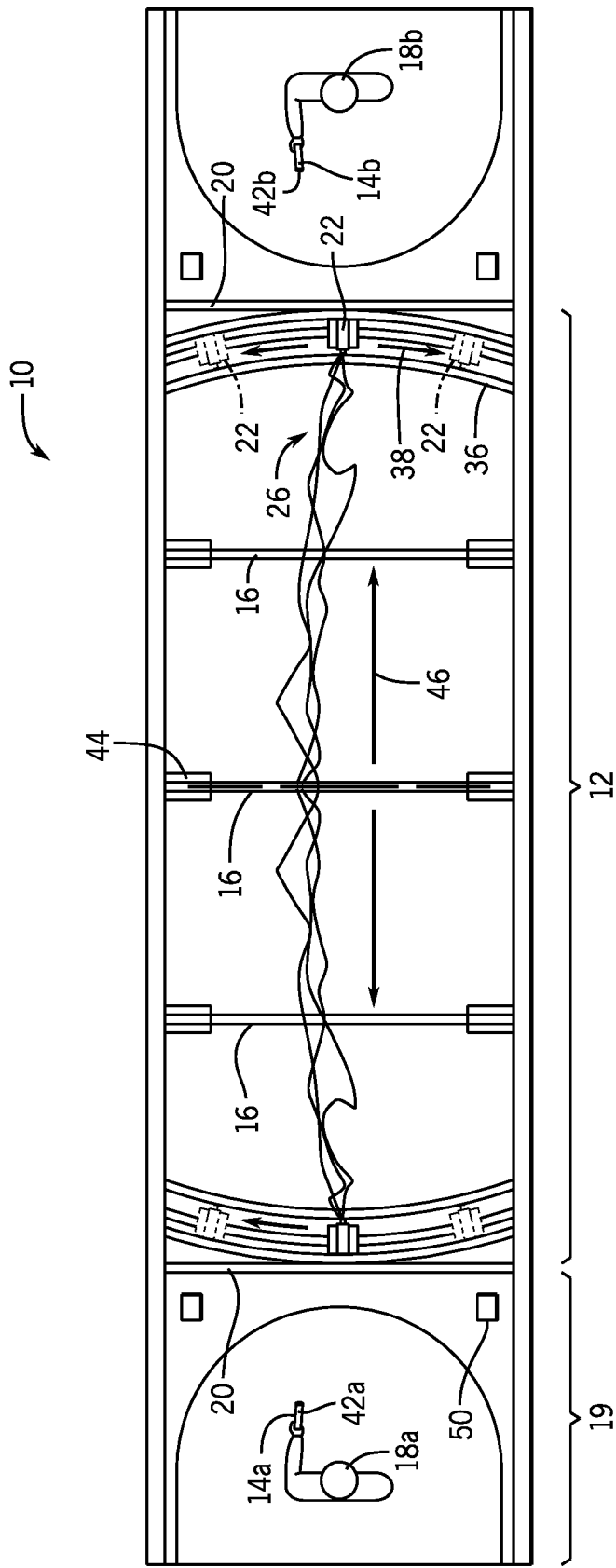
FIG. 2 is a schematic diagram illustrating a top view of an interactive energy effect attraction according to embodiments of the disclosure.

FIG. 2 illustrates a top view of the interactive energy effect system 10 of FIG. 1 showing the mechanical tracks that facilitate movement of the energy emitter 22 and the multi-layer display system 16 based on the user 18 interaction with the energy emission system 12. The movement of the energy emitter 22 during the user 18 interaction is facilitated through an emitter track 36 to which the energy emitter 22 is coupled. The emitter track 36 is disposed within the energy emission system 12 proximate to the user area 19. The emitter track 36 facilitates lateral or orbital (along a hemispherical or annular track) movement of the energy emitter 22 along the track, e.g., as shown by arrows 38. The movement of the energy emitter 22 laterally along the emitter track 36 corresponds to the movements conducted by the user 18. As the user 18 moves freely within the user area 19, the energy emitter 22 moves laterally to a position that corresponds to the user 18 position so that the energy emitter 22 and the user 18 are substantially aligned along the emitter track 36. This movement is dynamic and activated by the user 18 movement. The emitter track 36 may extend along a dimension bordering the user area 19 so that, no matter where the user 18 moves within the user area 19, the energy emitter 22 can align in at least one plane with the user 18.

The system 10 may operate to align the energy emitter 22 with the user 18 torso, head, designated operating hand (e.g., spell-casting hand), or with an extending end or tip 42 of the user-associated object (e.g., a ray gun, a wand, a nozzle, a sword) along the emitter track 36. The user 18 positioning of the user-associated object 14 in the x-plane facilitates the energy emitter 22 movement laterally about the emitter track 36. The user's 18 ability to direct the energy emitter 22 through positioning of their user-associated object 14 further facilitates an interactive effect experience.

The movement of the user-associated object 14 is detected through one or more sensors, such as position sensors 50. In an embodiment, the position sensors 50 are oriented to capture movements of each user 18. The collected position data generated from the position sensors 50 is then transmitted via sensor signals to a controller of the system 10. The position sensors 50 can include computer vision sensors (e.g., cameras), depth cameras, Light Detection and Ranging (LIDAR) devices, motion sensors, and light sensors, radio frequency (RF) sensors that receive a uniquely identifying RF signal from a user-associated object having a radio-frequency identification (RFID) tag, optical sensors and so forth. In an embodiment, the user-associated object 14 is passive, and the position data is based on image or other captured data from the position sensors 50 of the user-associated object 14 or the user's hand when no user-associated object 14 is employed. In one embodiment, the user-associated object includes a marker, such as a retroreflective marker, that facilitates identification of the tip 42 of the user-associated object 14 within the sensor data. In another embodiment, the user-associated object 14 may communicate position data, including orientation data, or object identification data to the system 10 through wireless transmissions from an RFID tag, or any combination thereof.

Position data captured by the position sensors 50 further facilitates tracking of the user-associated object 14, and enables efficient collection of motion data and user identification data. For example, if a first user 18a and a second user 18b are competing in a battle scenario, the first user 18a may position their user-associated object tip 42a left of center during the motion or gesture performed with the user-associated object 14a. The position sensors 50 are then able to use the motion data of the user-associated object 14a of the first user 18a to generate instructions to control movement along the emitter track 36 to position the energy emitter 22 left of center via movement along the emitter track 36 laterally, e.g. as shown by the arrows 38. The energy emitter 22 is then positioned to release energy, shown as the plasma bolts 26, from a position corresponding to the position of the user-associated object 14a during movement or gesture by the first user 18a. A similar positioning process occurs for the second user 18b during the battle scenario; with respect to motion or gesture of the user-associated object 14b performed by the second user 18b. This data is used to position the second user's 18b energy emitter. The position of the energy emitter 22 for each respective user 18 corresponds to each user's motion with their user-associated object 14. This creates a dynamic battle experience with energy emitters 22 that follow the users 18 movement.

In addition to movement of the emitters 22 of the energy emission system 12, the multi-layer display system 16 may also be repositioned in response to user actions. The multi-layer display system 16 is coupled to a display track 44, which facilitates movement of the multi-layer display system 16 in at least one plane of motion. The display track 44 facilitates movement in the z-plane towards or away from the user 18 as demonstrated by arrows 46, and, in certain embodiments, in the y-plane to facilitate up or down movement. The ability of the multi-layer display system 16 to shift towards a certain user 18 in the z-plane facilitates communication of battle information to the user 18 (e.g. user recognition of progress, how well the user is performing the associated movements, and status of user in battle in a battle scenario) who activated the movement of the multi-layer display system 16.

The display movement and coordinated display content is dynamic and based on the user 18 actions to enhance the user experience. For example, in a battle scenario, the first user 18a and the second user 18b simultaneously perform respective motions or gestures, e.g., using their hands or with the user-associated object 14. The position sensors 50 collect the first user 18a and the second user 18b motion data (e.g., position data tracked over time) and the system assesses the motion data to generate control instructions to move one or both of the multi-layer display system 16 and the energy emitter 22. The position data transmitted by the position sensors 50, directs the multi-layer display system 16 to move in the z-plane as shown by the arrows 46 (e.g. closer or farther from the user 18). Thus, as the battle progresses, the multi-layer display system 16 can be moved along the display track 44 away from whichever user 18 is determined to be winning or the stronger competitor according to the assessment techniques disclosed herein. The multi-layer display system 16 can receive energy impacts from users 18 that directly face each other and, at the initiation of the battle, may be positioned at an approximately equal distance from each user area 19. Moving the multi-layer display system 16 towards a particular user 18, and thus the received energy impact of both energy emitters 22, creates the effect of the energy being closer to the user 18 and losing a battle. Further, the multi-layer display system 16 may display media content that augments the energy emission effects to cause the impact to appear brighter or larger as the multi-layer display system 16 moves towards a particular user 18.

For example, if the second user 18b performed the gesture more accurately, the multi-layer display system 16, directed by the motion data, would move farther from the second user 18b via the display track 44, e.g. the arrows 46. This movement relays to the second user 18b that they have performed better in the scenario because the multi-layer display system 16 intercepts the plasma bolt emission 26. Thus, the user 18 who performed the gesture more accurately, in this example the second user 18b, can observe the impact of movement of the multi-layer display system 16 when the second user energy emitter 22 is able to shoot energy a farther distance than their opponent's energy based on a respective distance of each user 18 to the multi-layer display system 16. The multi-layer display system 16 can also indicate battle status through the display screen included in the multi-layer display system 16.

Figure 3:
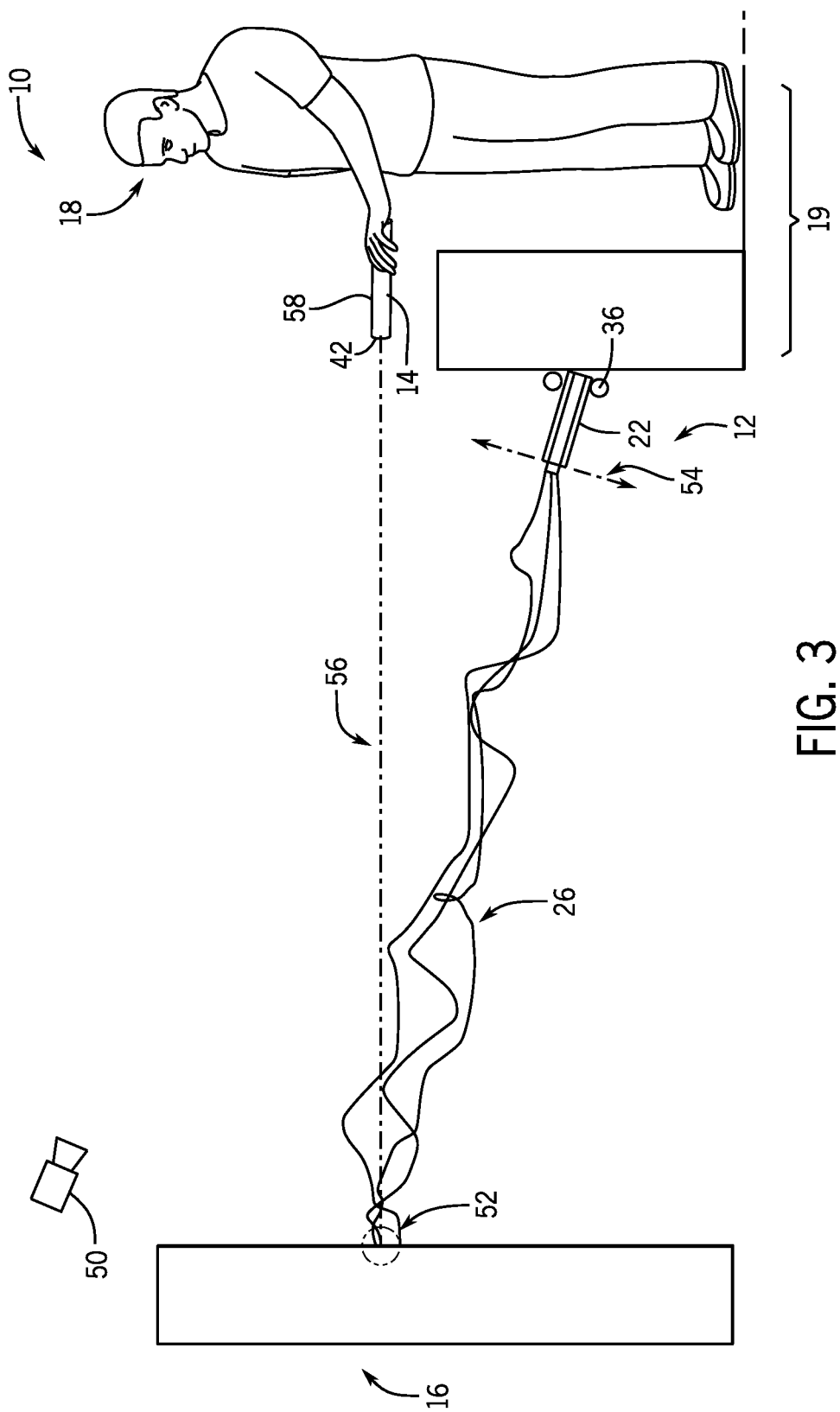
FIG. 3 is a schematic diagram illustrating a side view of an embodiment of the interactive energy effect system according to embodiments of the disclosure.

FIG. 3 illustrates a side view of the interactive energy effect system 10 showing an embodiment of coordinated movement and steering of the energy emission system 12 towards a target 52 on the multi-layer display system 16 based on the position/orientation of the user-associated object 14. The system receives the position data based on the user 18 motion, e.g., movement of the user-associated object 14 corresponding to a desired gesture or motion that is tracked via the position sensors 50. The position sensors 50 determine the position of user-associated object in the user area 19. The position sensors 50 then transmit the position data, and the system identifies a hypothetical path of the energy emission (e.g., target path 56) and the target position 52 on the multi-layer display system 16. This target position 52 is where the energy would impact the multi-layer display if emanating directly from the user-associated object 14. The energy emitter 22 is then controlled to be oriented or aimed towards the target position 52 on the multi-layer display system 16 to align the path of energy emission to the orientation and position of the user-associated object 14 and to hit the target position 52. The ability of the energy emitter 22 to adjust the emission target to correspond to the user-associated object 14 orientation and position creates the illusion that energy is shooting out from the user-associated object 14 and that the user 18 is controlling and aiming energy emission. This illusion enables the user 18 to have an immersive experience wherein the user 18 perceives the energy as emanating out of their user-associated object 14 and resulting from the position the user 18 selected for the user-associated object.

For example, if the user 18 positions their user-associated object 14 at a certain angle, the position sensor 50 can collect position data of the user-associated object 14 and use this data to project a target path 56 and target position 52 on the multi-layer display system 16. The target position 52 is used to generate control instructions to the energy emitter 22 and, in embodiments, to direct the energy emitter 22 laterally via the emitter track 36 and/or tilt the energy emitter 22 up or down (e.g., arrows 54) to an orientation that will cause emitted energy to intercept the target position 52 on the multi-layer display 16. This creates the illusion that the energy emission is coming directly from the user-associated object 14, and that the user 18 is directing the effect emission. The user 18 position information may include the absolute position in space, changes in position, orientation, and changes in orientation. For example, for a wand or gun shaped user-associated object 14, the system 10 may acquire the orientation based on estimating an axis extending through two points (e.g., the tip 42 and an interior point 58) on the user-associated object 14 or by using data from an orientation sensor on the user-associated object 14. In the depicted embodiment, the target path 56 is aligned along the long axis of the user-associated object 14. The user-associated object 14 may also include a visible marker that is resolvable by the position sensor 50 and from which the orientation can be estimated. In an embodiment, the user-associated object 14 may include an orientation sensor that transmits orientation information to a controller of the system 10.

Figure 4:
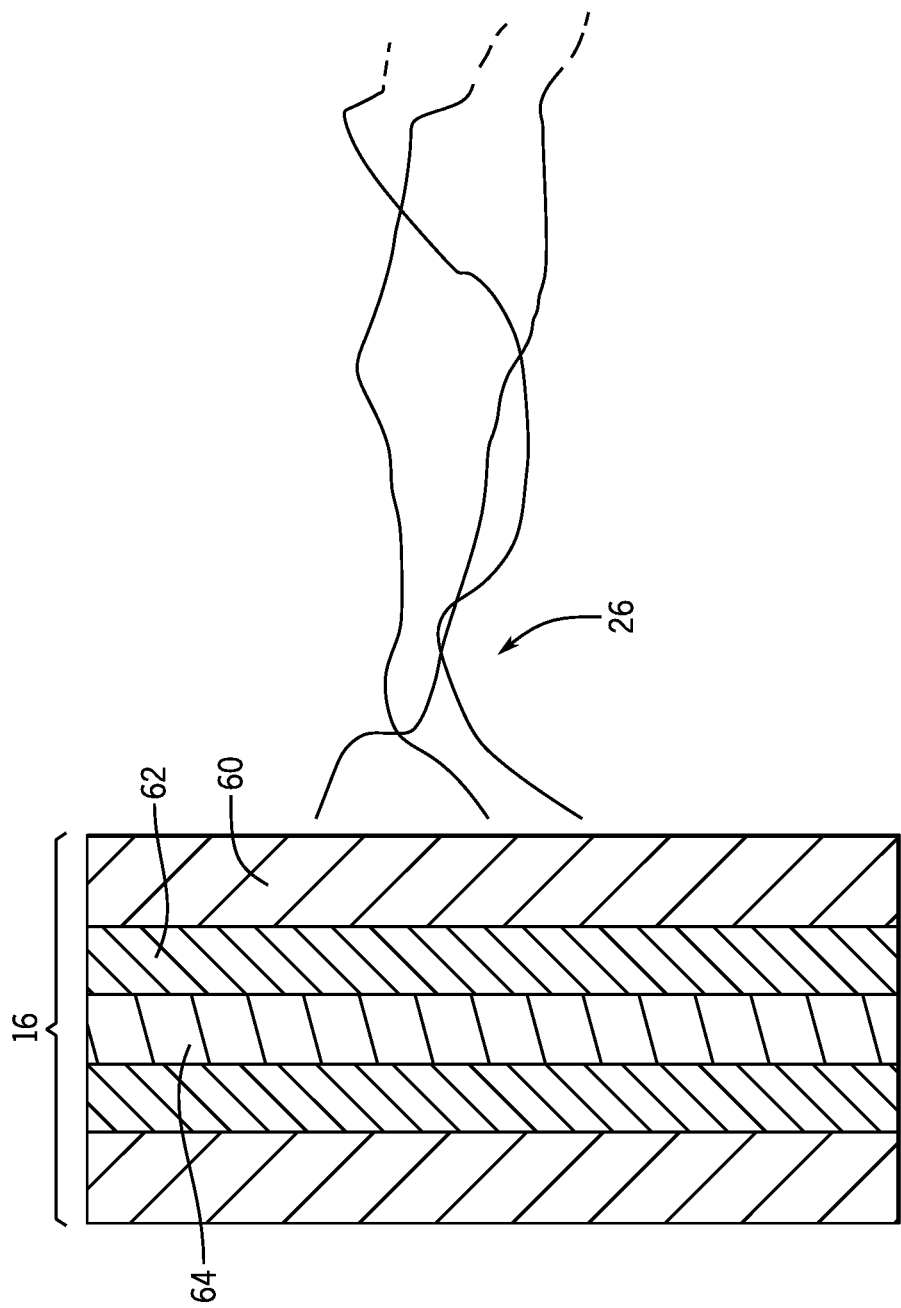
FIG. 4 is a schematic diagram illustrating a cross sectional view of the multi-layer display system according to embodiments of the disclosure.

The multi-layer display system 16 may include features that enhance the immersive experience. FIG. 4 illustrates a cross-sectional view of the multi-layer display system 16 that receives energy emitted from the energy emitter 22. The multi-layer display system 16 includes one or more transparent or transmissive layers that permit observation and interaction in battle scenarios with multiple users 18. The multi-layer display system 16 includes an exterior layer 60, an intermediate layer 62, and an interior layer 64. In the present embodiment, the exterior layer 60 may be a clear glass or polymer layer, such as a transparent metallic glass, with material properties (e.g., resistant, light in weight) for durability and electrical conductivity. In an embodiment, the exterior layer 60 includes metal additives or components to facilitate conductivity. The exterior layer 60 enables the multi-layer display system 16 to absorb impact of bolt emissions. The intermediate layer 62 may include a transparent metal sheet (e.g., transparent aluminum glass). The metallic sheet of the intermediate layer 62 facilitates plasma attraction from the energy emitter 22 and enables targeting of the plasma bolt 26 to the multi-layer display system 16. The metallic sheet may be present in an array throughout the intermediate layer 62, or present in discontinuous regions throughout the intermediate layer 62 to target impacts at particular locations on the multi-layer display system 16. The metallic sheet of the intermediate layer 62 may also include a selectively conductive metallic sheet material (e.g. conductive components that may turned on and off via system commands). The intermediate metallic layer 62 facilitates direction of the plasma bolt 26. This attraction process permits the energy emission to be directed according to desired placement based on the user-associated object motion 14 as discussed above in FIG. 3.

The interior layer 64 may be implemented as a display screen, e.g., an OLED display that operates to display media content that enhances the user experience. The OLED display screen can display instructions to perform a specific motion or gesture and provide feedback to the user 18 based on the assessment or accuracy of the gesture performed by the user-associated object 14. The screen can display battle information enabling the multiple users 18 in a battle scenario to view battle performance, past battle statistics, and other battle information. The OLED display screen feedback is beneficial for the users 18 to interact with an opponent while also displaying an enhanced emission effect in addition to the energy emission from the energy emitter 22.

Figure 5:
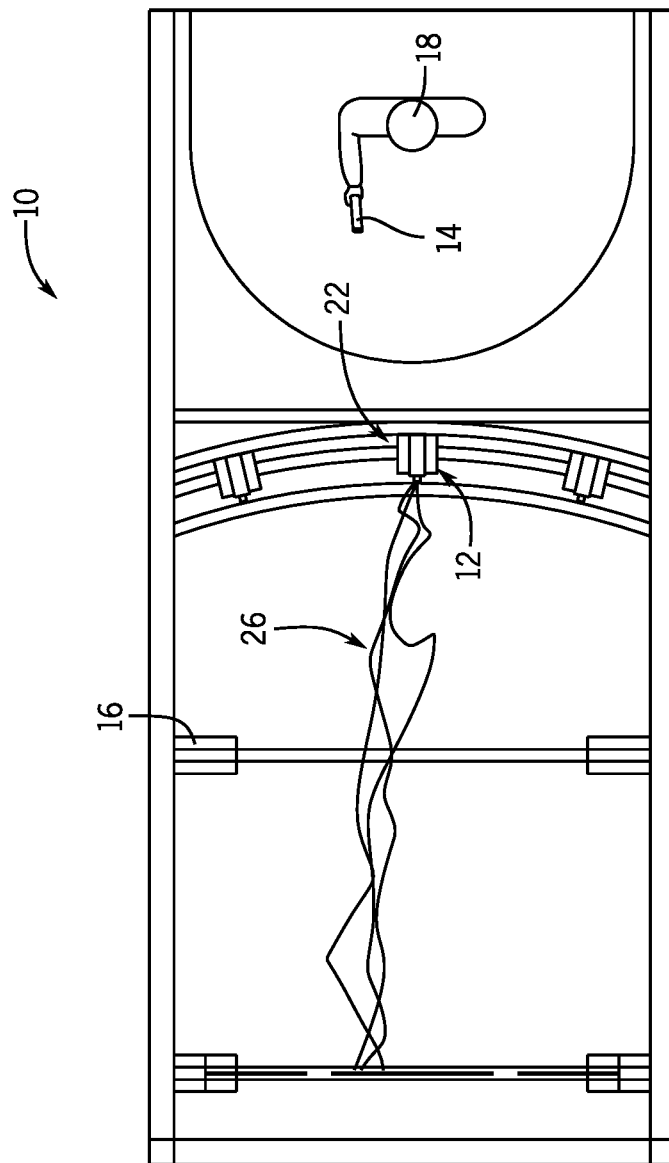
FIG. 5 is a schematic diagram illustrating a top view of a single user embodiment of the interactive energy effect system according to embodiments of the disclosure.

The disclosed embodiments may be used to implement a battle attraction with two or more participants. In addition, the interactive energy effect system 10 may be used to facilitate energy effects with an interactive environment. FIG. 5 illustrates an embodiment in which one or more users 18 can interact with a show prop 68 or other interactive element within the environment. Accordingly, the user 18 may interact to emit energy towards the show prop 68. The show prop 68 can include a robotic device, display screen, special effect system, or any combination thereof that produces a special effect audibly, haptically, visually, or otherwise. The show prop 68 receives communication to output a certain action or effect based on the user-associated object 14 movement performed by the user 18. The show prop 68 facilitates effects or status updates to the user 18 along with the OLED display screen of the multi-layer display system 16. For example, the user 18 can make a movement or gesture using the user-associated object 14. The show prop 68 can receive commands based on the motion to emit an effect or reaction based on a received command and may, in certain embodiments, act as the opponent in the battle scenario.

Figure 6:
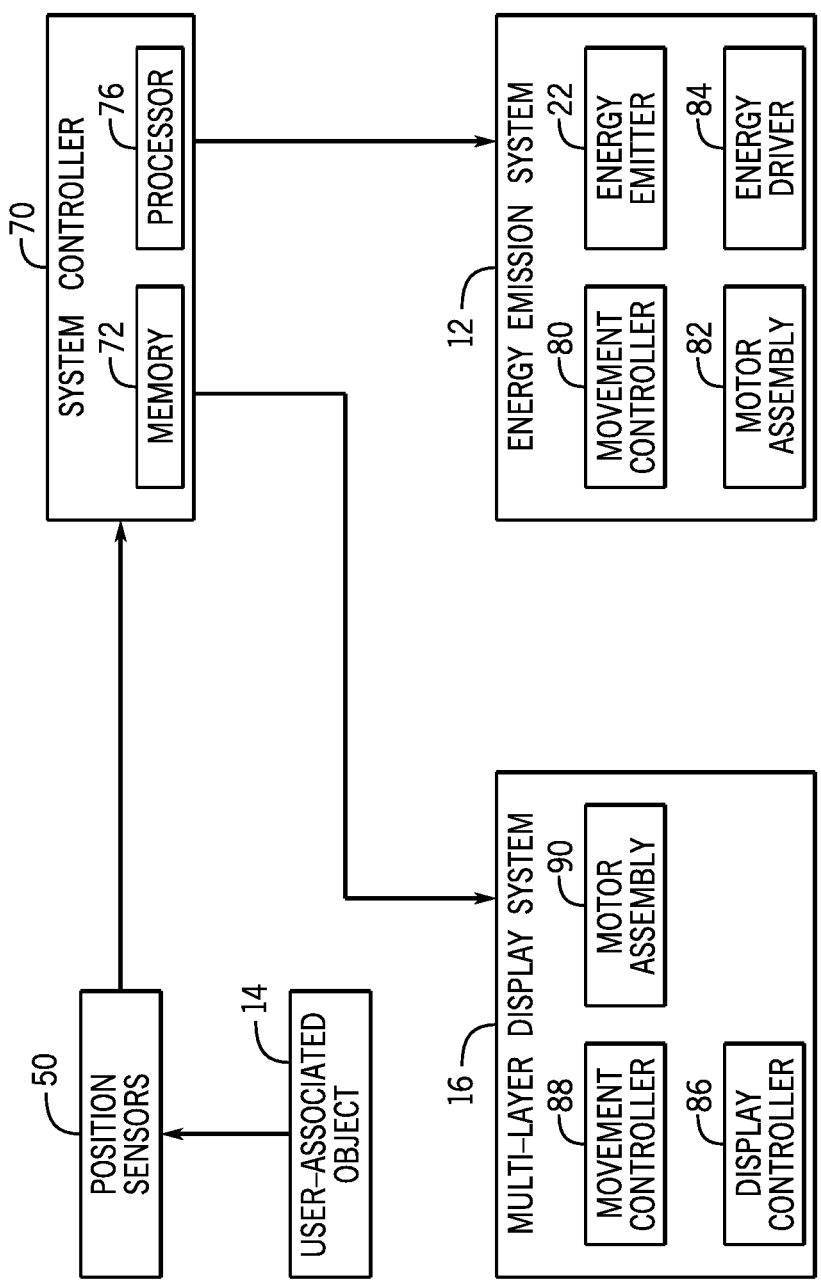
FIG. 6 is a block diagram of the interactive energy effect attraction according to embodiments of the disclosure.

FIG. 6 is a block diagram of the interactive energy effect system 10. The system 10 includes a system controller 70 having a memory device 72 and a processor 76 which can include multiple microprocessors, one or more "general-purpose" microprocessors, one or more special-purpose microprocessors, and/or one or more application specific integrated circuits (ASICs), or some combination thereof. For example, the processor 76 may include one or more reduced instruction set computer (RISC) processors. The memory device 72 may include volatile memory, such as random access memory (RAM), and/or nonvolatile memory, such as read-only memory (ROM). The memory device 72 may store information, such as control software (e.g., control algorithms). The communication is then wirelessly transmitted from the system controller 70 to the energy emission system 12.

The system controller 70 is in communication with one or more position sensors 50, the energy emission system 12, and the multi-layer display system 16. Based on inputs from the position sensor 50, and in certain embodiments from the user-associated object 14, motion of the user 18 and/or the user-associated object 14 is detected and processed by the system controller 70 to generate instructions for a movement controller 80 of the energy emission system 12. The instructions cause the movement controller 80 to move the energy emitter 22 laterally and/or tilt in an upwards or downwards direction based off commands sent by the system controller 70 and received by the movement controller 80. The instructions may activate a motor assembly 82 of the energy emission system 12 to drive the movement of the energy emitter 22. The type and/or intensity of energy emitted can be controlled via an energy driver 84, and can be determined based on commands sent by the system controller 70 to include energy specifics, e.g. a specific emission focus of the emitted energy, a specific intensity of the emitted energy, or a specific color of the emitted energy. In addition, the system controller 70 communicates instructions generated based on the processed motion data of the user-associated object 14 to a movement controller 88 of the multi-layer display system 16. The multi-layer display system 16 receives the instructions based on the user-associated object 14 motion data and facilitates the movement controller 88 to direct the moving display farther from or closer to the user 18 in the z-plane depending on accuracy of the user 18 motion of the user-associated object 14.

The system controller 70 may assess the motion data (e.g., position data) of the user 18 or user-associated object 14 to control movement and display content of the multi-layer display system 16. In one embodiment, the motion data may be compared to a stored set of motions and assessed for accuracy based on preset quality metrics. The accuracy may be a determination of whether the motion data matches a stored motion and, if matching, the system 10 generates a set of instructions based on the matching and, if no match is present, the system 10 initiates another set of instructions. In one example, the assessment may factor in stored profile data associated with the user 18. The assessment may be based on the user 18 or the user-associated object 14 aligning with or intercepting one or more absolute points in space to determine if a weapon is aimed accurately. The assessment may also include individualized accuracy of motion analysis, wherein the system 10 can analyze differences in the users 18 perception of eye-hand-target orientation and apply these differences to the analysis of the user 18 movement.

For example, the movement controller 88 is sent commands by the system controller 70 to move the multi-layer display system 16 via a motor assembly 90 in the z-plane to a distance farther from the user 18 who performed the gesture more accurately. This signals to the user 18 that they have performed better than their competitor has, and is a visual representation of the users 18 performance in the battle. The multi-layer display system 16 also communicates guest interactive feedback or battle feedback through projections on the display screen contained in the system. A display controller 86 is sent commands via the system controller 70 based on accuracy of motion data, and will process and display specific feedback to guest on the OLED display screen included in the multi-layer display system 16.

Figure 7:
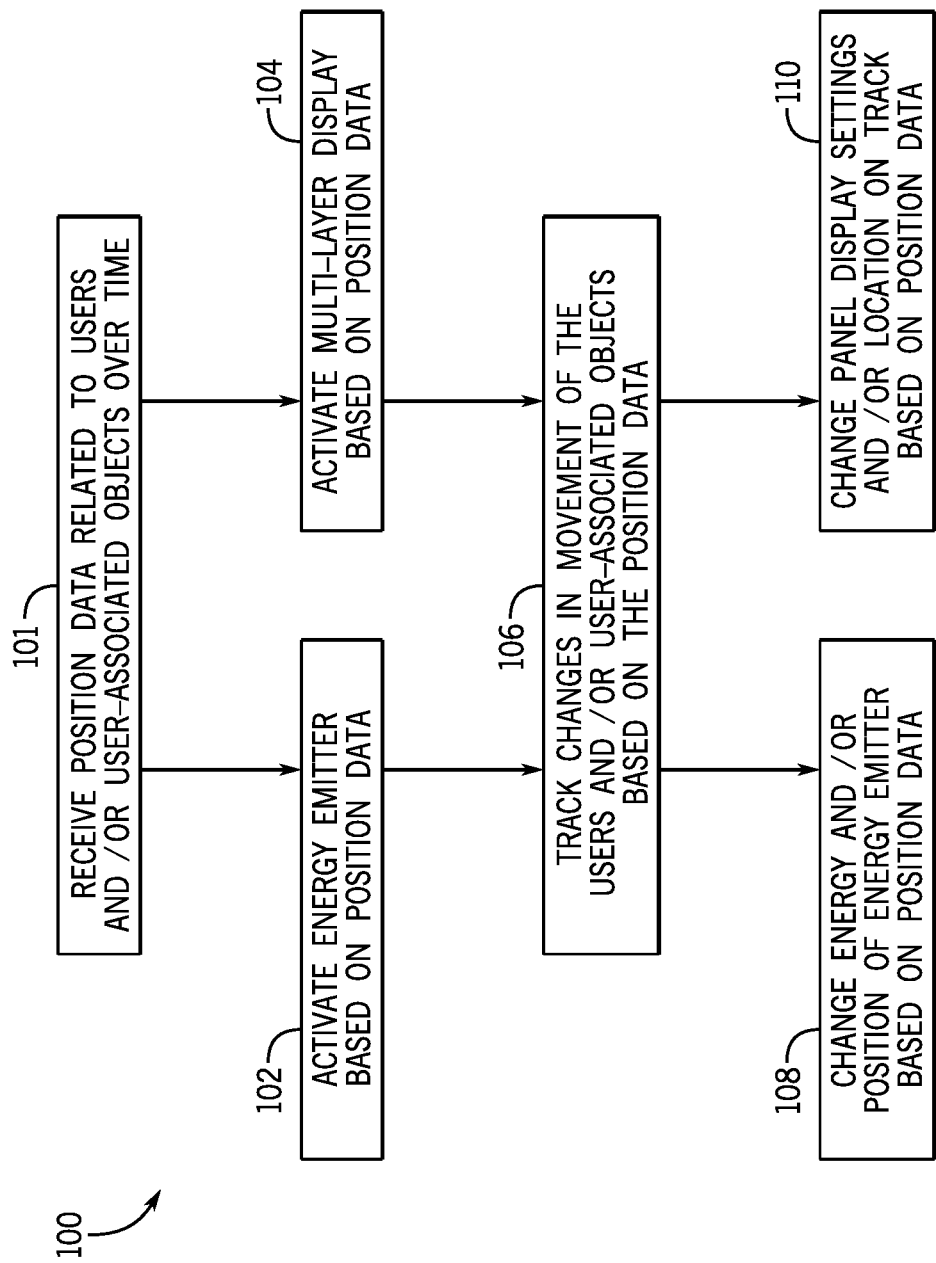
FIG. 7 is a flowchart of a method of operation of the interactive energy effect system according to embodiments of the disclosure.

FIG. 7 is a flow diagram of a method 100 of controlling components of the system 10. In block 101, the system 10, e.g., the system controller 70, receives position data from one or more position sensors 50. The position data is related to guest motion or motion of the user-associated object 14 over time. In a multi-user embodiment, as demonstrated in FIG. 1, both of the users 18 are completing motions or commands via the user's 18 respective user-associated object 14. The position sensors 50 facilitate detection of multiple users, or a single user's motion with their user-associated object 14. The position sensors 50 then communicate the position information over time, e.g., motion data, to the system controller 70 that receives and processes the motion data and sends commands to the energy emission system 12 and the multi-layer display system 16. The motion data collected by the position sensors 50 may be used to activate the energy emission system 12, and activate a display on the multi-layer display system 16 as shown in blocks 102 and 104. The position sensors 50 continue to monitor changes in position of the user-associated object 14 over time throughout the user interactive experience as shown in block 106. The data is then processed and transmitted to the energy emission system 12, and commands are sent to update the energy emitter's 22 emitted energy and location based on the accuracy of user movement and position of the user-associated object 14 as shown in block 108. The change in energy emitted can cause variation in the plasma bolts 26, and the energy emitter 22 can emit the plasma bolts 26 in multiple ranges of color or different intensities so the user 18 can identify individual emission if in a multi-user scenario. The multi-layer display system also updates screen displays throughout the user experience, and moves the display in the y-plane and z-plane according to accuracy of the user-associated object 14 motion data as demonstrated in block 110.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to the figures discussed above may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An interactive energy effect system, the interactive energy effect system comprising:
   one or more sensors configured to generate a signal indicative of a position of a user-associated object;
   a system controller configured to receive the signal and configured to:
      generate first instructions and second instructions based on the signal;
      transmit the first instructions to an energy emission system to cause the energy emission system to reposition and activate an energy emitter; and
      transmit the second instructions to a multi-layer display system to cause the multi-layer display system to move towards or away from the user-associated object.

2. The interactive energy effect system of claim 1, wherein the one or more sensors comprise image sensors, radio frequency sensors, optical sensors, or any combination thereof.

3. The interactive energy effect system of claim 1, wherein the energy emitter comprises a plasma gun or a Tesla coil gun.

4. The interactive energy effect system of claim 3, wherein the first instructions comprise instructions to set a focus of emitted energy, set an intensity of the emitted energy, set a color of the emitted energy, or any combination thereof.

5. The interactive energy effect system of claim 1, wherein the user-associated object comprises an RFID tag, retroreflective marker, optical transmitter, or any combination thereof.

6. The interactive energy effect system of claim 5, wherein the user-associated object wirelessly communicates position data and user information to the one or more sensors.

7. The interactive energy effect system of claim 1, wherein the multi-layer display system comprises an interior metal layer or sheet.

8. The interactive energy effect system of claim 1, wherein the user-associated object comprises a wand.

9. A method of operating an interactive energy effect system, the method comprising:
   receiving, via a system controller, user-associated object position data;
   generating, via the system controller, instructions based on the position data;
   receiving the instructions at a movement controller;
   directing movement of an energy emitter based on the instructions;
   directing an emission of energy from the energy emitter based on the instructions;
   receiving, via an additional movement controller, the instructions; and
   directing, via the additional movement controller, movement of a multi-layer display system to intercept the emission of energy at a predetermined location based on the position data.

10. The method of claim 9, wherein the multi-layer display system comprises an exterior layer, an intermediate layer, and an interior layer.

11. The method of claim 9, wherein the multi-layer display system can display user status, battle feedback, and any combination thereof.

12. The method of claim 9, wherein an intermediate layer of the multi-layer display system is composed of a metal material.

13. The method of claim 12, wherein the multi-layer display system can contain selectively conductive metal regions.

14. The method of claim 9, wherein the energy emitter can move laterally along a track.

15. An interactive energy effect system, the interactive energy effect system comprising:
   an energy emitter;
   a display system; and
   a system controller configured to:
      receive, from one or more position sensors, position data of a user or a user-associated object;
      generate first instructions to orient the energy emitter relative to the display system based on the position data;

receive updated position data of the user or the user-associated object via the position sensors, wherein the updated position data is indicative of a motion pattern performed by the user or by the user-associated object;

identify the motion pattern in the position data; and generate second instructions based on the identified motion pattern to cause the display system to move towards the user-associated object or away from the user-associated object.

16. The system of claim 15, wherein the first instructions cause the energy emitter to emit energy having a particular color.

17. The system of claim 15, wherein the first instructions cause the energy emitter to move in a lateral direction or in an orbital motion along a track.

18. The system of claim 15, wherein the second instructions cause the display system to move in an up or down direction relative to the energy emitter.

19. The system of claim 15, wherein the second instructions cause the display system to display media content based on the identified motion pattern.

20. The system of claim 19, wherein media content is selected based on a comparison of the identified motion pattern to a preset motion pattern to determine an accuracy of the identified motion pattern.

* * * * *